United States Patent
Ma et al.

(10) Patent No.: US 11,999,475 B2
(45) Date of Patent: Jun. 4, 2024

(54) ROBOT WITH ADJUSTABLE ROTARY WING ANGLE

(71) Applicant: CCTEG CHINA COAL RESEARCH INSTITUTE, Beijing (CN)

(72) Inventors: Long Ma, Beijing (CN); Wenzhen Wu, Beijing (CN); Weizhen Zhang, Beijing (CN); Qingyong Meng, Beijing (CN); Ying Feng, Beijing (CN); Desheng Zhang, Beijing (CN); Weijian Xu, Beijing (CN); Qingfeng Rong, Beijing (CN); Yuliang Ma, Beijing (CN); Jie Zheng, Beijing (CN)

(73) Assignee: CCTEG China Coal Research Institute, Beijing (CN)

( * ) Notice: Subject to any disclaimer, the term of this patent is extended or adjusted under 35 U.S.C. 154(b) by 0 days.

(21) Appl. No.: 18/359,631

(22) Filed: Jul. 26, 2023

(65) Prior Publication Data
US 2024/0083575 A1 Mar. 14, 2024

(30) Foreign Application Priority Data
Aug. 1, 2022 (CN) .......................... 202210918291.7

(51) Int. Cl.
*B64C 35/00* (2006.01)

(52) U.S. Cl.
CPC .................. *B64C 35/008* (2013.01)

(58) Field of Classification Search
CPC .... B64C 35/008; A63H 27/12; A63H 33/005; B64U 10/70; B64U 50/19; B64U 50/13;
(Continued)

(56) References Cited

U.S. PATENT DOCUMENTS 9,061,558 B2 * 6/2015 Kalantari ............... A63H 27/12
9,428,019 B1 8/2016 Muhlrad
(Continued)

FOREIGN PATENT DOCUMENTS

CN 101314222 A 12/2008
CN 104260605 A 1/2015
(Continued)

OTHER PUBLICATIONS

OA for CN application 202210918291.7.
(Continued)

*Primary Examiner* — Medhat Badawi
*Assistant Examiner* — Icente Rodriguez
(74) *Attorney, Agent, or Firm* — Maginot, Moore & Beck, LLP

(57) ABSTRACT

A robot includes a housing including a first shell and a second shell and having a first configuration and a second configuration, a rack disposed in an inner cavity of the housing, a telescopic assembly disposed on the rack and connected between the first shell and the second shell, and a rotary wing assembly disposed on the rack and having a folded configuration and a flight configuration. The rotary wing assembly includes: a folding arm with one end rotatably connected to the rack, a rotary wing, and a tilting arm connected between the rotary wing and the folding arm, the tilting arm and the rotary wing are extended to an outside of the housing to be adapted to drive the robot to fly in the flight configuration, and the tilting arm is rotatable relative to the folding arm to adjust a rotation direction of the rotary wing.

8 Claims, 9 Drawing Sheets

(58) Field of Classification Search
CPC ........ B64U 50/14; B64U 20/40; B64U 30/16; B64U 60/60; B64U 60/10; B64U 60/40; B60F 5/02; B60F 5/00
See application file for complete search history.

(56) References Cited

U.S. PATENT DOCUMENTS

| | | | |
|---|---|---|---|
| 10,106,252 B1* | 10/2018 | Tearne | B64U 30/293 |
| 2015/0021107 A1 | 1/2015 | Thielman et al. | |
| 2018/0002035 A1* | 1/2018 | Neely | B64U 20/87 |
| 2021/0114730 A1* | 4/2021 | MacDonald | B64C 39/024 |
| 2023/0227184 A1* | 7/2023 | Heremans | B64U 30/299 244/129.1 |

FOREIGN PATENT DOCUMENTS

| | | |
|---|---|---|
| CN | 108515822 A | 9/2018 |
| CN | 108945395 A | 12/2018 |
| CN | 110171260 A | 8/2019 |
| CN | 112077855 A | 12/2020 |
| CN | 112172425 A | 1/2021 |
| CN | 112829843 A | 5/2021 |
| CN | 214727996 U | 11/2021 |
| CN | 113954592 A | 1/2022 |
| CN | 216375003 U | 4/2022 |
| JP | 2015117003 A | 6/2015 |
| JP | 2021178577 A | 11/2021 |
| KR | 20220072982 A | 6/2022 |

OTHER PUBLICATIONS

English translation of OA for CN application 202210918291.7.
Notice of Allowance for CN application 202210918291.7.
English translation of Notice of Allowance for CN application 202210918291.7.
A Kind of Multi-functional Toys Design, Journal of Jilin Institute of Chemical Technology, Sep. 2016 (CN).

* cited by examiner

ROBOT WITH ADJUSTABLE ROTARY WING ANGLE

CROSS-REFERENCE TO RELATED APPLICATION

This application claims priority to and benefits of Chinese Patent Application Serial No. 202210918291.7, filed Aug. 1, 2022, the entire content of which is incorporated herein by reference.

TECHNICAL FIELD

The present disclosure relates to the field of robots, and particularly to a robot with an adjustable rotary wing angle.

BACKGROUND

The housing of a spherical robot rolls as a whole to drive the robot to move rapidly and stably with a high maneuverability, and the housing of the spherical robot may protect the mechanism inside the robot during the movement. The spherical robot in the related art has a poor trafficability and cannot roll through complex and rugged terrains, so the movement range of the robot is restricted by the terrain conditions.

SUMMARY

The present disclosure aims to solve one of the technical problems in the related art to at least a certain extent. Therefore, embodiments of the present disclosure provide a robot with an adjustable rotary wing angle. The robot with the adjustable rotary wing angle has good trafficability and high flight maneuverability.

The robot with the adjustable rotary wing angle provided by embodiments of the present disclosure includes: a housing, a rack, a telescopic assembly, and a rotary wing assembly. The housing includes a first shell and a second shell and has a first configuration and a second configuration, the first shell and the second shell are separated for robot flight in the first configuration, and the first shell and the second shell are closed for robot rolling in the second configuration. The rack is disposed in an inner cavity of the housing. The telescopic assembly is disposed on the rack and connected between the first shell and the second shell, the telescopic assembly is telescopic to switch the housing to the first configuration or the second configuration. The rotary wing assembly is disposed on the rack and has a folded configuration and a flight configuration, the rotary wing assembly includes a folding arm, a tilting arm and a rotary wing, one end of the folding arm is rotatably connected to the rack, the tilting arm is connected between the rotary wing and the folding arm, the folding arm, the tilting arm and the rotary wing are accommodated in the housing to roll the housing in the folded configuration, the tilting arm and the rotary wing are extended to an outside of the housing to be adapted to drive the robot to fly in the flight configuration, and the tilting arm are rotatable relative to the folding arm to adjust a rotation direction of the rotary wing.

The robot with the adjustable rotary wing angle provided by embodiments of the present disclosure has good trafficability and high flight maneuverability.

In some embodiments, the rotary wing assembly includes a tilting motor, one end of the tilting motor is connected to one end of the folding arm away from the rack, and the other end of the tilting motor is connected to the tilting arm to drive the tilting arm to rotate relative to the folding arm.

In some embodiments, a first seat is provided at one end of the folding arm close to the tilting arm, a second seat is provided at one end of the tilting arm close to the folding arm, the tilting motor includes a first portion and a second portion, the second portion is rotatably fitted to the first portion, the first portion is connected to the first seat, the second portion is connected to the second seat and has a through hole, a rotary shaft is provided in the through hole and penetrates through the first seat and the second seat to improve a radial carrying capacity between the folding arm and the tilting arm.

In some embodiments, the rotary wing assembly includes a driver having one end rotatably connected to a base and the other end rotatably connected to the folding arm, and a length of the driver is adjustable to drive the rotary wing assembly to switch between the flight configuration and the folded configuration.

In some embodiments, the rotary wing is located at one end of the tilting arm away from the folding arm and includes a plurality of spiral arms and a flight motor, the flight motor is connected to the plurality of spiral arms to be adapted to drive the plurality of spiral arms to rotate to generate a lift, the plurality of spiral arms are uniformly arranged at intervals in a circumferential direction of the flight motor in the flight configuration to retain the rotary wing assembly in dynamic balance during the rotation, and the plurality of spiral arms are extended in a length direction of the folding arm in the folded configuration to accommodate the rotary wing assembly in the housing.

In some embodiments, the rotary wing assembly includes a first rotary wing assembly and a second rotary wing assembly, and the first rotary wing assembly and the second rotary wing assembly are symmetrically arranged in a width direction of the rack.

In some embodiments, the amphibious robot with the adjustable rotary wing angle includes: a first drive motor disposed at one end of the telescopic assembly and connected to the first shell; and a second drive motor disposed at the other end of the telescopic assembly and connected to the second shell. The first drive motor is adapted to drive the first shell to rotate, and the second drive motor is adapted to drive the second shell to rotate.

In some embodiments, the telescopic assembly includes: a screw assembly; a telescopic motor; a first pushing frame connected to the first drive motor and assembled with the rack in a guided manner in a length direction of the rack; and a second pushing frame connected to the second drive motor and assembled with the rack in the guided manner in the length direction of the rack. The telescopic motor is connected to the screw assembly to drive the screw assembly to rotate, and the screw assembly extends in the length direction of the rack and is connected to the first pushing frame and the second pushing frame to drive the first pushing frame and the second pushing frame to move relative to the rack.

In some embodiments, the robot with the adjustable rotary wing angle includes a pendulum assembly disposed on the rack and adapted to adjust a center of gravity of the robot to adjust a direction of travel of the robot or to improve a stability.

In some embodiments, the pendulum assembly includes a first assembly, a second assembly and a counterweight, the first assembly is disposed on the rack, one end of the second assembly is rotatably assembled with the first assembly, the counterweight is disposed at the other end of the second assembly, the first assembly is adapted to drive the second assembly to swing to adjust an inclination angle of the counterweight, and the second assembly is adapted to drive the counterweight to translate to adjust a spacing between the counterweight and the first assembly.

REFERENCE NUMERAL

Figure 1:
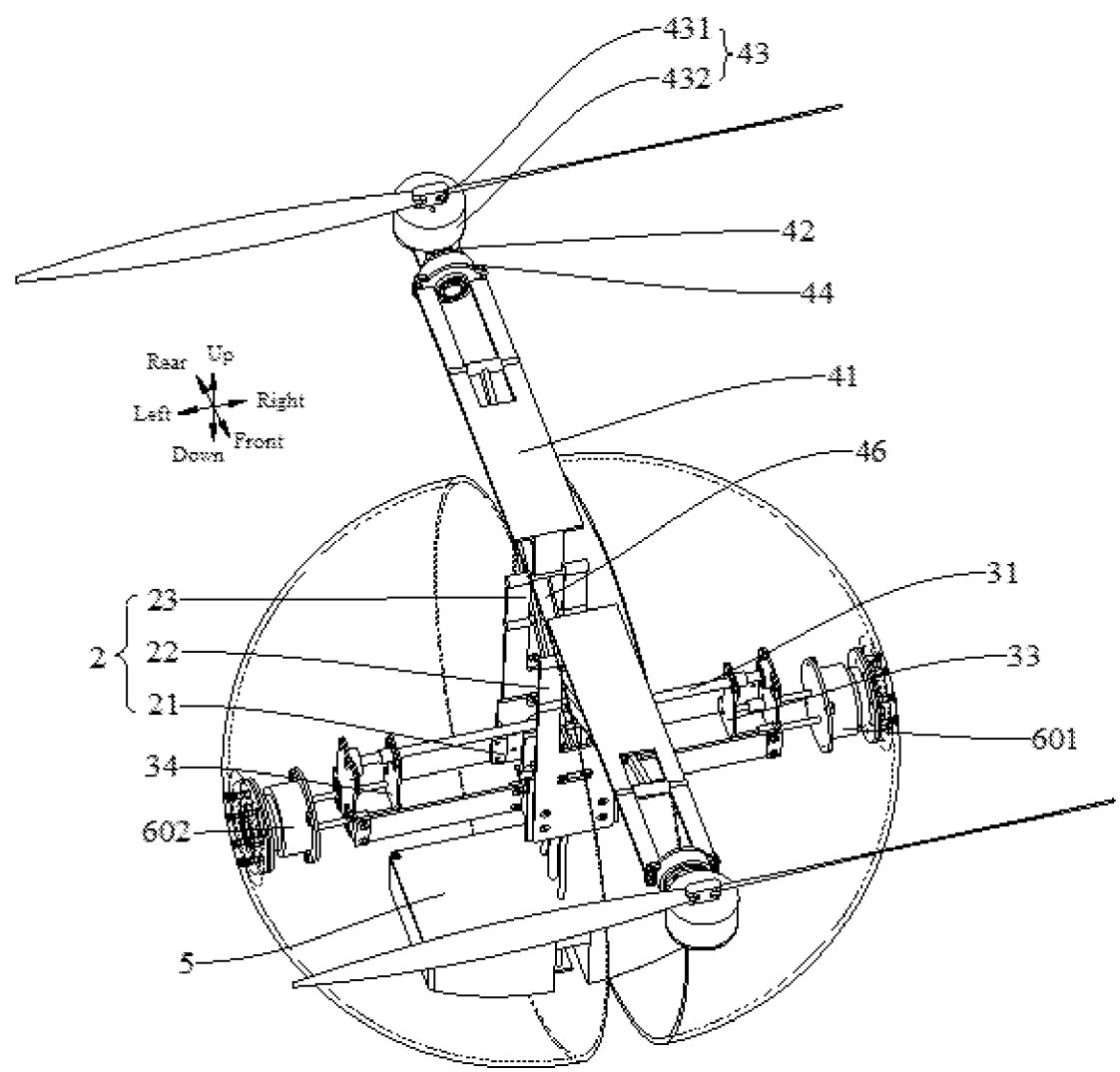
FIG. 1 is a schematic diagram illustrating a flight configuration of a robot with an adjustable rotary wing angle according to embodiments of the present disclosure.

Housing 1; first shell 11; second shell 12;
Rack 2; main frame 21; first base 22; second base 23;
Telescopic assembly 3; screw assembly 31; two-way screw 311; first nut portion 312; second nut portion 313; telescopic motor 32; first pushing frame 33; second pushing frame 34;
Rotary wing assembly 4; folding arm 41; first seat 411; first through hole 412; tilting arm 42; second seat 421; second through hole 422; rotary wing 43; spiral arm 431; flight motor 432; tilting motor 44; first portion 441; second portion 442; rotary shaft 45; driver 46; first rotary wing assembly 401; second rotary wing assembly 402;
Pendulum assembly 5; first assembly 51; first swing motor 511; first rotor portion 5111; first stator portion 5112; second swing motor 512; second rotor portion 5121; second stator portion 5122; rotating frame 513; first portion 5131; second portion 5132; connecting portion 5133; first protrusion 5134; second protrusion 5135; second assembly 52; adjusting motor 521; third rotor portion 5211; third stator portion 5212; adjusting screw 522; first guide rod 523; second guide rod 524; counterweight 53; avoiding groove 531; end plate 54;
First drive motor 601; second drive motor 602.

DETAILED DESCRIPTION

Embodiments of the present disclosure are described in detail below, examples of which are shown in the accompanying drawings. Embodiments described herein with reference to drawings are explanatory and used to generally understand the present disclosure, and shall not be construed to limit the present disclosure.

A robot with an adjustable rotary wing angle according to embodiments of the present disclosure will be described below with reference to the accompanying drawings.

As shown in FIG. 1 to FIG. 11, the robot with the adjustable rotary wing angle according to embodiments of the present disclosure includes a housing 1, a rack 2, a telescopic assembly 3 and a rotary wing assembly 4.

The housing 1 has a first configuration and a second configuration, the first shell 11 and the second shell 12 are separated for robot flight in the first configuration, and the first shell 11 and the second shell 12 are closed for robot rolling in the second configuration.

Specifically, the housing 1 is spherical and has a spherical inner cavity. The rack 2, the telescopic assembly 3 and the rotary wing assembly 4 are located in the inner cavity. The first shell 11 and the second shell 12 are hemispherical and symmetrically arranged in a left-right direction, and the left end of the first shell 11 and the right end of the second shell 12 may be assembled together so that the first shell 11 and the second shell 12 are assembled into the spherical housing 1.

In the second configuration, the first shell 11 and the second shell 12 are assembled together to form the spherical housing 1, thereby facilitating the rolling motion of the robot with the adjustable rotary wing angle according to embodiments of the present disclosure on the ground. In the first configuration, the first shell 11 and the second shell 12 are separated to allow the inner cavity of the housing 1 to communicate with the outside, so that a part of the rotary wing assembly 4 may be extended to an outside of the housing 1 to drive the robot with the adjustable rotary wing angle according to embodiments of the present disclosure to fly.

The rack 2 is disposed in the inner cavity of the housing 1. Specifically, as shown in FIG. 1, the rack 2 includes a main frame 21, a first base 22 and a second base 23. The main frame 21 is located inside the housing 1 and extends in the left-right direction, the main frame 21 has a mounting groove extending in the left-right direction, and an upper end of the mounting groove communicates with an upper end of the main frame 21 to facilitate mounting the telescopic assembly 3 in the main frame 21.

The telescopic assembly 3 is disposed on the rack 2 and connected between the first shell 11 and the second shell 12, and the telescopic assembly 3 is telescopic to switch the housing 1 to the first configuration or the second configuration.

Specifically, as shown in FIG. 1, the telescopic assembly 3 is cooperatively connected to the main frame 21 of the rack 2, and the telescopic assembly 3 extends in the left-right direction. The left end of the telescopic assembly 3 is rotatably connected to the second shell 12, the right end of the telescopic assembly 3 is rotatably connected to the first shell 11, and the length of the telescopic assembly 3 along the left-right direction is adjustable, thereby adjusting the spacing between the first shell 11 and the second shell 12, and switching the housing 1 between the first configuration and the second configuration.

The rotary wing assembly 4 is disposed on the rack and has a folded configuration and a flight configuration. The rotary wing assembly 4 includes a folding arm 41, a tilting arm 42 and a rotary wing 43. One end of the folding arm 41 is rotatably connected to the rack 2, and the tilting arm 42 is connected between the rotary wing 43 and the folding arm 41. The folding arm 41, the tilting arm 42 and the rotary wing 43 are accommodated in the housing 1 to roll the housing 1 in the folded configuration, the tilting arm 42 and the rotary wing 43 are extended to an outside of the housing 1 to be adapted to drive the robot to fly in the flight configuration, and the tilting arm 42 is rotatable relative to the folding arm 41 to adjust a rotation direction of the rotary wing 43.

Figure 6:
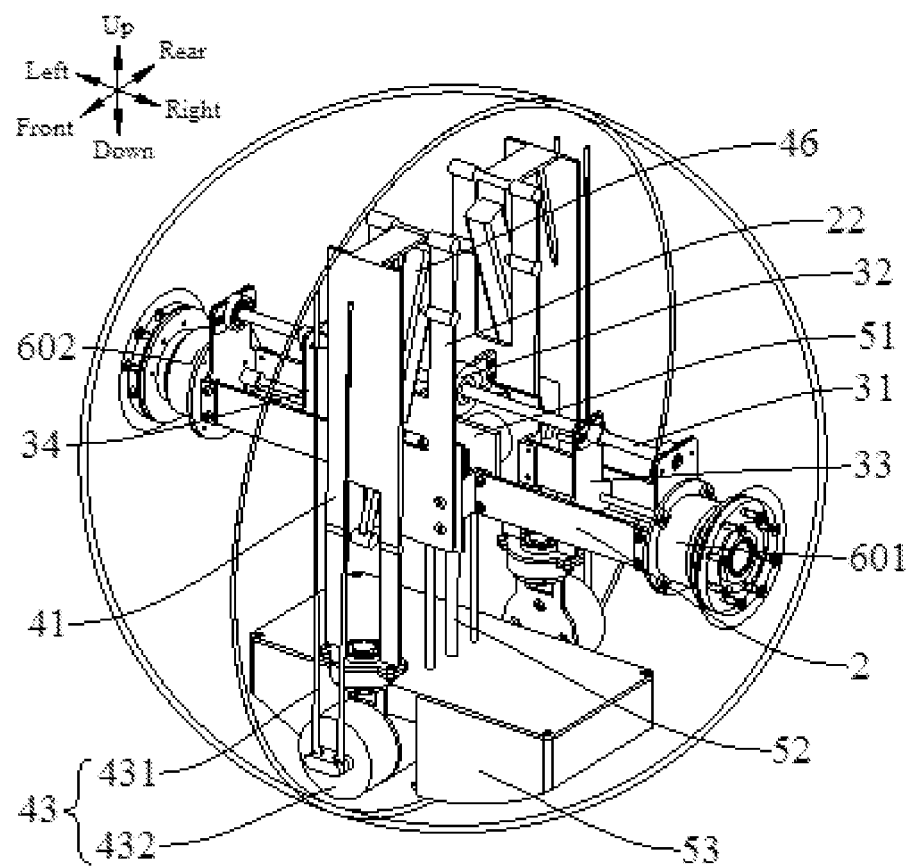
FIG. 6 is a schematic diagram illustrating a second configuration of a robot with an adjustable rotary wing angle according to embodiments of the present disclosure.
Figure 7:
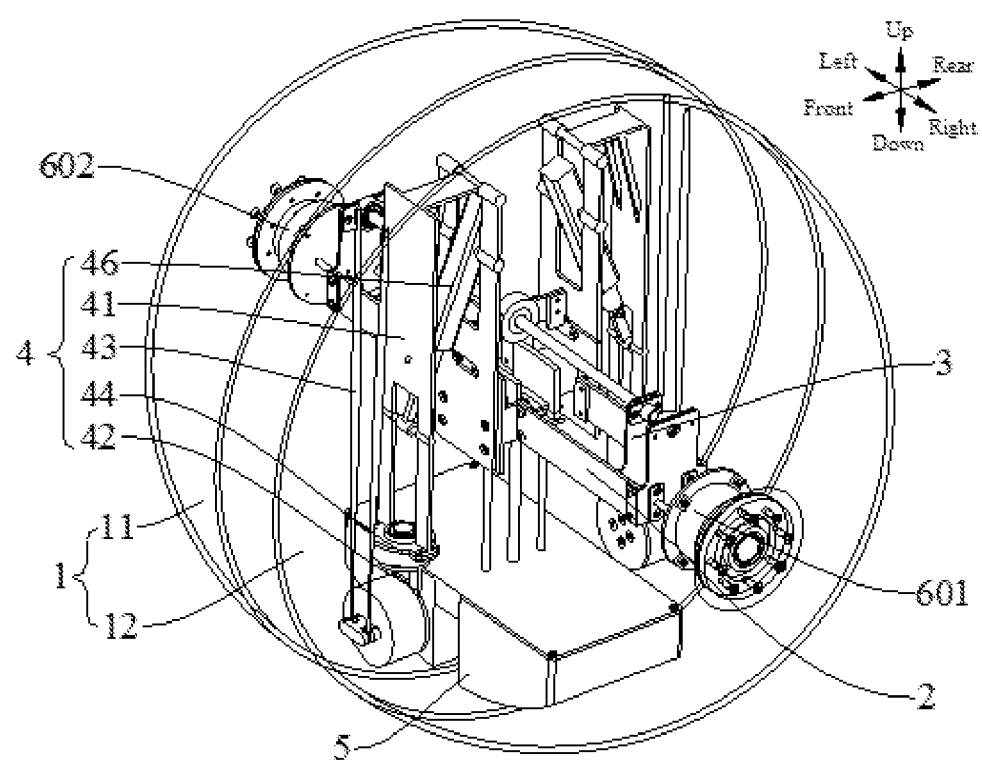
FIG. 7 is a schematic diagram illustrating a first configuration of a robot with an adjustable rotary wing angle according to embodiments of the present disclosure.

Specifically, as shown in FIG. 6 and FIG. 7, in the folded configuration, the rotary wing assembly 4 is accommodated in the housing 1 to avoid the first shell 11 and the second shell 12, so that the first shell 11 and the second shell 12 may be joined and closed to form the housing 1, thereby enabling the robot with the adjustable rotary wing angle according to embodiments of the present disclosure to be in the second configuration.

Figure 8:
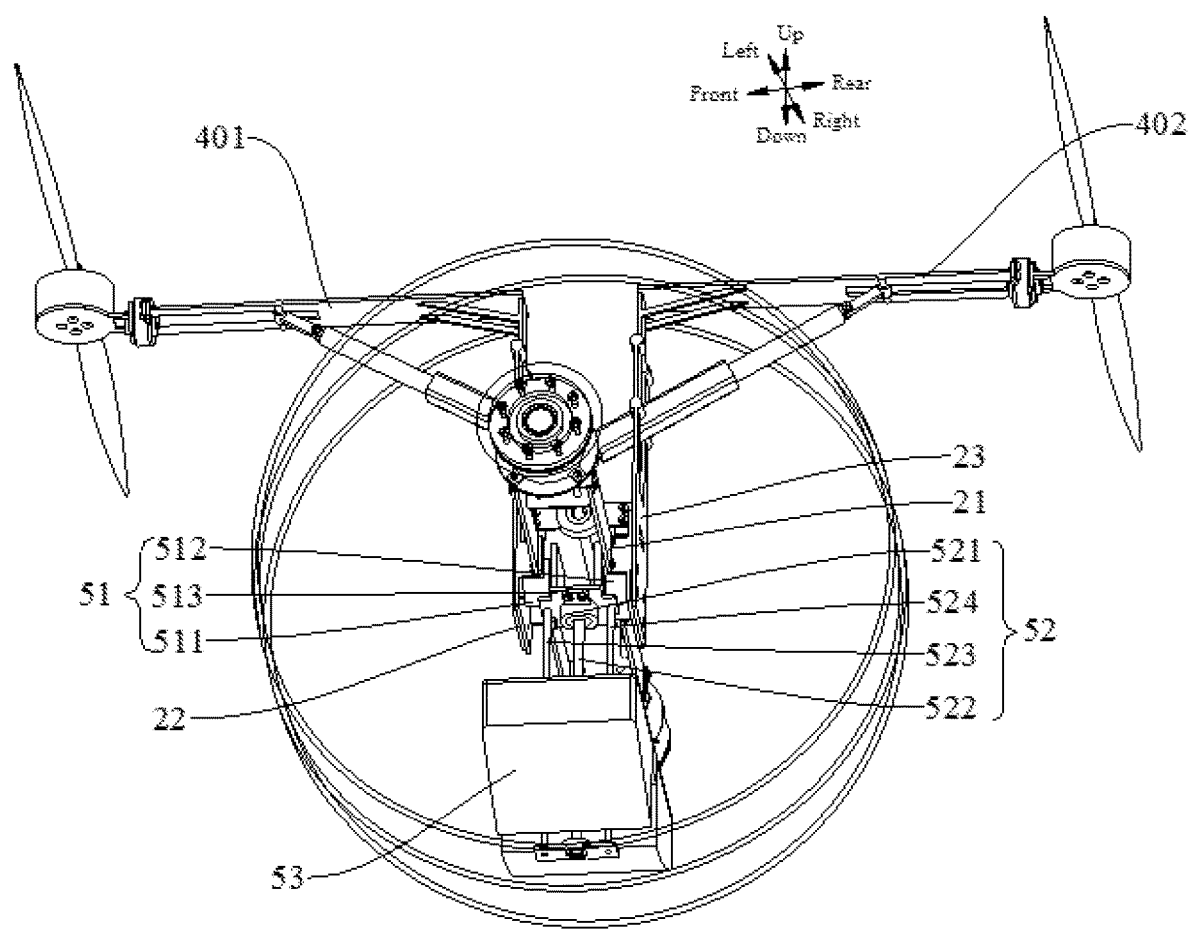
FIG. 8 is a schematic diagram illustrating a pendulum assembly of a robot with an adjustable rotary wing angle according to embodiments of the present disclosure.

When the robot with the adjustable rotary wing angle according to embodiments of the present disclosure is in the first configuration, the rotary wing assembly 4 may be in the flight configuration. As shown in FIG. 1 and FIG. 8, in the flight configuration, the rotary wing 43 and the tilting arm 42 extend out of the housing 1, and after extending out of the housing 1, the rotary wing 43 may generate a downward thrust to drive the robot with the adjustable rotary wing angle according to embodiments of the present disclosure to fly.

The tilting arm 42 may rotate in a circumferential direction of an extending direction of the folding arm 41. Since a rotary shaft 45 of the rotary wing 43 is fixed relative to the tilting arm 42, when the tilting arm 42 rotates relative to the folding arm 41, the rotation direction of the rotary wing 43 also rotates relative to the folding arm 41, thereby changing the direction in which the rotary wing 43 generates the thrust, and a component force of the thrust in the horizontal direction drives the horizontal movement of the robot with the adjustable rotary wing angle according to embodiments of the present disclosure.

It should be noted that, when the housing 1 is in the second configuration, the rotary wing assembly 4 is always in the folded configuration to enable the robot with the adjustable rotary wing angle according to embodiments of the present disclosure to roll to advance, and when the housing 1 is in the first configuration, the rotary wing assembly 4 may be switched between the folded configuration and the flight configuration.

The robot with the adjustable rotary wing angle according to embodiments of the present disclosure is able to roll to advance in the second configuration, and has high maneuverability under relatively flat terrain conditions, but when the robot is required to pass through a relatively rugged terrain, the robot cannot roll to advance. In the first configuration, the rotary wing assembly 4 may be adjusted to a flight configuration to drive the robot with the adjustable rotary wing angle according to embodiments of the present disclosure to fly, so as to enable the robot with the adjustable rotary wing angle according to embodiments of the present disclosure to fly over a relatively rugged terrain. When the robot with the adjustable rotary wing angle according to embodiments of the present disclosure is in the flight configuration, the direction of the thrust generated by the rotary wing 43 is adjusted by rotating the tilting arm 42, and the component force of the thrust in the horizontal direction drives the robot with the adjustable rotary wing angle according to embodiments of the present disclosure to move horizontally, thereby improving the maneuverability of the robot with the adjustable rotary wing angle according to embodiments of the present disclosure in the flight configuration, so that the robot with the adjustable rotary wing angle according to embodiments of the present disclosure has good trafficability and high flight maneuverability.

In some embodiments, the rotary wing assembly 4 includes a tilting motor 44, one end of the tilting motor 44 is connected to one end of the folding arm 41 away from the rack 2, and the other end of the tilting motor 44 is connected to the tilting arm 42 to drive the tilting arm 42 to rotate relative to the folding arm 41.

Figure 2:
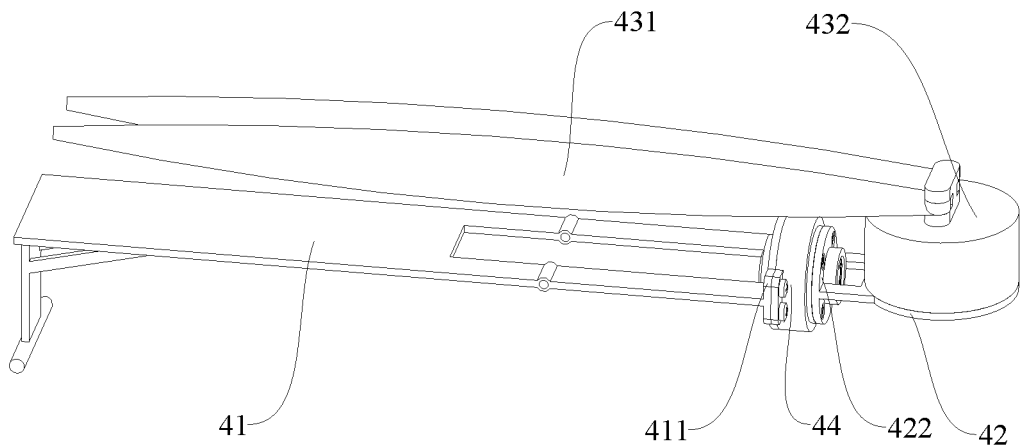
FIG. 2 is a schematic diagram illustrating a rotary wing assembly in FIG. 1 in a folded configuration.
Figure 3:
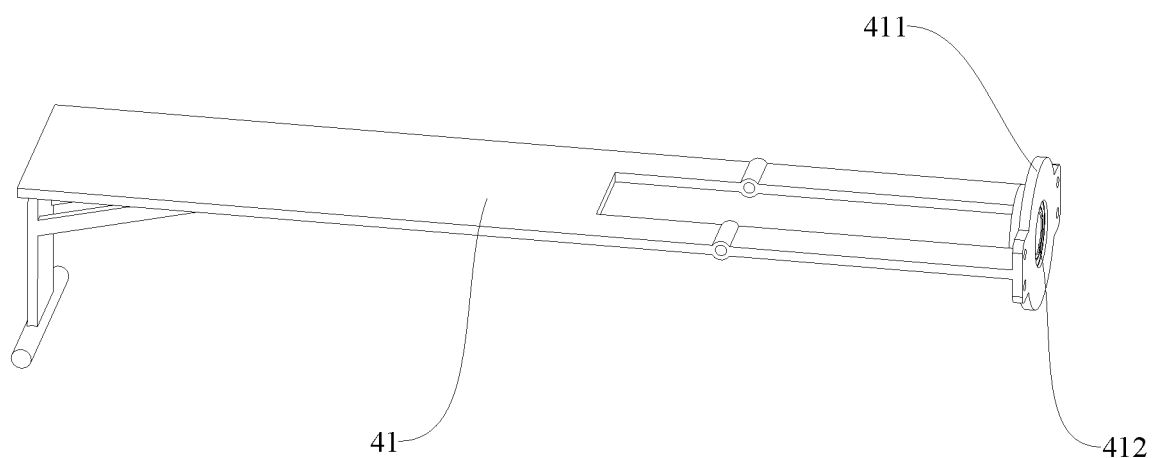
FIG. 3 is a schematic diagram illustrating a folding arm in FIG. 2.
Figure 4:
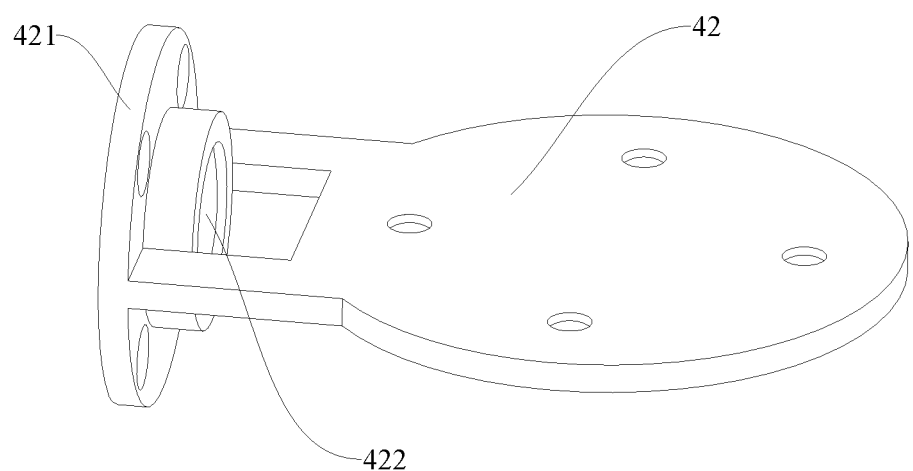
FIG. 4 is a schematic diagram illustrating a tilting arm in FIG. 2.
Figure 5:
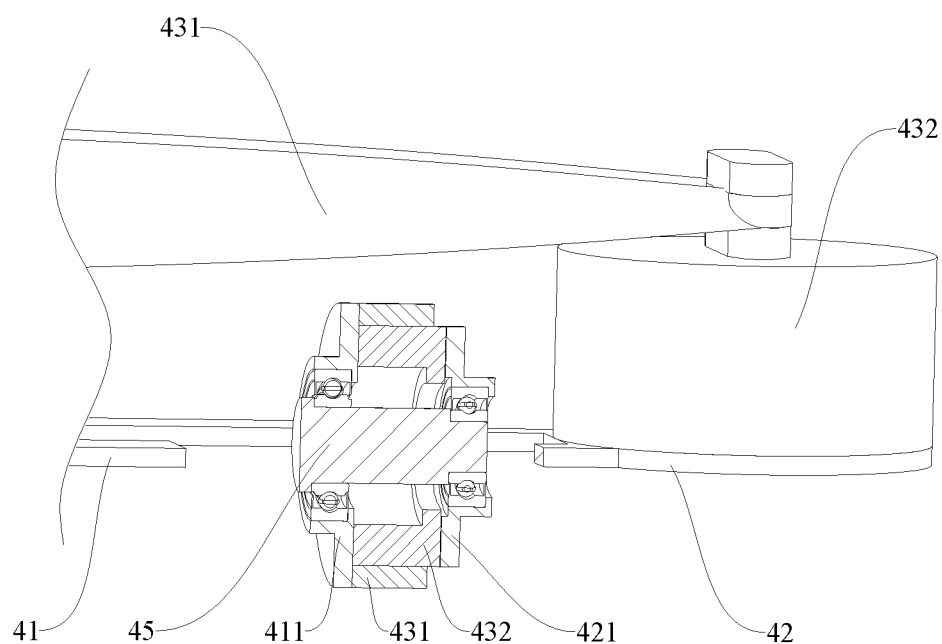
FIG. 5 is a schematic diagram illustrating a tilting motor in FIG. 2.

Specifically, as shown in FIG. 1, FIG. 2 and FIG. 5, the tilting motor 44 is arranged between the tilting arm 42 and the folding arm 41, the rotary shaft 45 of the tilting motor 44 coincides with the extending direction of the folding arm 41, and the extending direction of the tilting arm 42 coincides with the rotary shaft 45 of the tilting motor 44. Both ends of the tilting motor 44 may be relatively rotated, thereby relatively rotating the tilting arm 42 and the folding arm 41.

The tilting motor 44 is a stepping motor, whereby the tilting motor 44 may precisely control the rotation direction of the rotary wing 43 to drive the robot with the adjustable rotary wing angle according to embodiments of the present disclosure to move horizontally in the flight configuration, thereby improving the maneuverability of the robot with the adjustable rotary wing angle according to embodiments of the present disclosure in the flight configuration.

In some embodiments, a first seat 411 is provided at one end of the folding arm 41 close to the tilting arm 42, a second seat 421 is provided at one end of the tilting arm 42 close to the folding arm 41. The tilting motor 44 includes a first portion 441 and a second portion 442, the second portion 442 is rotatably fitted to the first portion 441, the first portion 441 is connected to the first seat 411, the second portion 442 is connected to the second seat 421 and has a through hole, and the rotary shaft 45 is provided in the through hole and penetrates through the first seat 411 and the second seat 421 to improve a radial carrying capacity between the folding arm 41 and the tilting arm 42.

Specifically, as shown in FIG. 1, FIG. 2 and FIG. 5, one end of the folding arm 41 is adapted to be rotatably connected to the rack 2, the other end of the folding arm 41 is provided with the first seat 411, the first seat 411 extends in a plane perpendicular to the extending direction of the folding arm 41, one end of the tilting arm 42 close to the folding arm 41 is provided with the second seat 421, the second seat 421 is arranged in parallel and spaced apart from the first seat 411, and the tilting motor 44 is connected between the first seat 411 and the second seat 421.

The first portion 441 of the tilting motor 44 is a stator, the second portion 442 of the tilting motor is a rotor, the geometric axis of the second portion 442 coincides with the geometric axis of the first portion 441, the second portion 442 is fitted in the first portion 441 and rotates relative to the first portion 441, one end of the first portion 441 close to the first seat 411 is detachably connected to the first seat 411 via a connector, and one end of the second portion 442 close to the second seat 421 is detachably connected to the second seat 421 via a connector.

Thereby, the second portion 442 is rotated by a set angle relative to the first portion 441 under the drive of an electromagnetic force, so that the tilting arm 42 is rotated by a set angle relative to the folding arm 41. Since the folding arm 41 remains fixed relative to the rack 2 in the flight configuration, the tilting motor 44 drives the rotation direction of the rotary wing 43 to rotate by a set angle relative to the rack 2 to drive the horizontal movement of the robot with the adjustable rotary wing angle according to embodiments of the present disclosure.

As shown in FIG. 5, the tilting motor 44 is a circumferential motor, the second part 442 is provided with a passage therein, the first seat 411 is provided with a first through hole 412 coaxial with the passage, the second seat 421 is provided with a second through hole 422 coaxial with the passage, the rotary shaft 45 successively penetrates through the first through hole 412, the passage and the second through hole 422, the rotary shaft 45 is connected to the hole wall of the first through hole 412 via a bearing, and the rotary shaft 45 is connected to the hole wall of the second through hole 422 via a bearing.

Therefore, in the flight configuration, the lift generated by the rotary wing 43 drives the robot with the adjustable rotary wing angle according to embodiments of the present disclosure to fly, the rotary wing 43 is connected to the tilting arm 42 so as to generate a torsion moment between the tilting arm 42 and the folding arm 41, and the structural strength between the tilting arm 42 and the folding arm 41 may be increased by providing the rotary shaft 45 without affecting the relative rotation between the tilting arm 42 and the folding arm 41, so as to bear the torsion moment between the tilting arm 42 and the folding arm 41 applied by the rotary wing 43.

In some embodiments, the rotary wing assembly 4 includes a driver 46, one end of the driver 46 is rotatably connected to a base, and the other end of the driver 46 is rotatably connected to the folding arm 41, and a length of the driver 46 is adjustable to drive the rotary wing assembly 4 to switch between the flight configuration and the folded configuration.

Specifically, one end of the driver 46 is rotatably connected to a middle section of the folding arm 41 to form a first connection position, and the other end of the driver 46 is rotatably connected to a middle section of the base to form a second connection position.

Therefore, when the folding arm 41 swings from the folded configuration to the flight configuration, the distance between the first connection position and the second connection position increases. The length of the driver 46 is adjustable, so as to adapt the change in the distance between the first connection position and the second connection position on the one hand, and on the other hand to increase the distance between the first connection position and the second connection position, thereby switching the folding arm 41 between the flight configuration and the folded configuration.

In some embodiments, the rotary wing 43 is located at one end of the tilting arm 42 away from the folding arm 41, and includes a plurality of spiral arms 431 and a flight motor 432, the flight motor 432 is connected to the plurality of spiral arms 431 to be adapted to drive the plurality of spiral arms 431 to rotate to generate a lift. The plurality of spiral arms 431 are uniformly arranged at intervals in a circumferential direction of the flight motor 432 in the flight configuration to retain the rotary wing assembly 4 in dynamic balance during the rotation, and the plurality of spiral arms 431 are extended in a length direction of the folding arm 41 in the folded configuration to accommodate the rotary wing assembly 4 in the housing.

Specifically, the rotary wing 43 is a foldable rotary wing 43, and in the folded configuration, the plurality of spiral arms 431 are folded and received in the folding arm 41, and in this case, the plurality of spiral arms 431 extend in a direction substantially parallel to the folding arm 41, and the plurality of spiral arms 431 abut against a side of the folding arm 41 facing away from the base to reduce the width of the plurality of spiral arms 431, thereby reducing the width of the rotary wing assembly 4, so that the width of the rotary wing assembly 4 is smaller than the spacing between the first shell 11 and the second shell 12, so that the rotary wing assembly 4 can be accommodated into the housing 1 in the folded configuration.

In the flight configuration, the folding arm 41 moves the rotary wing assembly 4 to the outside of the housing 1, the flight motor 432 drives the plurality of spiral arms 431 to rotate around an axial line of the flight motor 432 to generate a lift, and the plurality of spiral arms 431 are uniformly arranged at equal intervals along the outer peripheral side of the flight motor 432, so that the mass of the plurality of spiral arms 431 is uniformly distributed in the circumferential direction of the flight motor 432 to retain the rotary wing assembly 4 in dynamic balance during the rotation.

Therefore, the flight motor 432 is located at the end of the folding arm 41 away from the base, and the rotary wing 43 is the foldable rotary wing 43, which on the one hand increases the length of the plurality of spiral arms 431 to facilitate the rotary wing assembly 4 to provide a greater lift in the flight configuration, and on the other hand increases the moment arm length of the lift moment of the rotary wing assembly 4 in the flight configuration, thereby increasing the stability of the robot with the adjustable rotary wing angle according to embodiments of the present disclosure in the flight configuration.

In some embodiments, the rotary wing assembly 4 includes a first rotary wing assembly 401 and a second rotary wing assembly 402, and the first rotary wing assembly 401 and the second rotary wing assembly 402 are symmetrically arranged in a width direction of the rack 2.

Specifically, as shown in FIG. 8, the first rotary wing assembly 401 is rotatably connected to the first base 22, and the second rotary wing assembly 402 is rotatably connected to the second base 23. The first base 22 and the second base 23 are arranged symmetrically in a front-rear direction, so that the first rotary wing assembly 401 and the second rotary wing assembly 402 are symmetrical in the front-rear direction. The first rotary wing assembly 401 and the second rotary wing assembly 402 move synchronously, i.e. when one of the first rotary wing assembly 401 and the second rotary wing assembly 402 is switched from the flight configuration to the folded configuration, the other one of the first rotary wing assembly 401 and the second rotary wing assembly 402 is also switched from the flight configuration to the folded configuration.

Therefore, the first rotary wing assembly 401 and the second rotary wing assembly 402 are symmetrically arranged in the front-rear direction, so that, on the one hand, the robot with the adjustable rotary wing angle according to embodiments of the present disclosure has a uniform weight distribution in the front-rear direction, and the center of gravity of the robot in the static state is stabilized in a vertical geometric central axial line of the robot; and on the other hand, the lift moment generated by the first rotary wing assembly 401 is offset by the lift moment generated by the second rotary wing assembly 402 in the flight state of the robot with the adjustable rotary wing angle according to embodiments of the present disclosure, thereby stabilizing the flight state of the robot.

In some embodiments, the robot with the adjustable rotary wing angle includes a first drive motor 601 and a second drive motor 602. The first drive motor 601 is disposed at one end of the telescopic assembly 3 and connected to the first shell 11, and the first drive motor 601 is adapted to drive the first shell 11 to rotate. The second drive motor 602 is disposed at the other end of the telescopic assembly 3 and connected to the second shell 12, the second drive motor 602 is adapted to drive the second shell 12 to rotate.

Specifically, one end of the first drive motor 601 is connected to the first shell 11, the other end of the first drive motor 601 is connected to the telescopic assembly 3, and one end of the second drive motor 602 is connected to the second shell 12, and the other end of the second drive motor 602 is connected to the telescopic assembly 3.

Therefore, the first drive motor 601 may drive the first shell 11 to rotate relative to the telescopic assembly 3 and the rack 2, and the second drive motor 602 may drive the second shell 12 to rotate relative to the telescopic assembly 3 and the rack 2, so that in the second configuration, the first shell 11 and the second shell 12 rotate relative to the rack 2 to drive the rolling motion of the robot with the adjustable rotary wing angle according to embodiments of the present disclosure.

In some embodiments, the telescopic assembly 3 includes: a screw assembly 31; a telescopic motor 32; a first pushing frame 33, and a second pushing frame 34. The first pushing frame 33 is connected to the first drive motor 601 and assembled with the rack 2 in a guided manner in a length direction of the rack 2. The second pushing frame 34 is connected to the second drive motor 602 and assembled with the rack 2 in the guided manner in the length direction of the rack 2. The telescopic motor 32 is connected to the screw assembly 31 to drive the screw assembly 31 to rotate, and the screw assembly 31 extends in the length direction of the rack 2 and is connected to the first pushing frame 33 and the second pushing frame 34 to drive the first pushing frame 33 and the second pushing frame 34 to move relative to the rack 2.

Figure 9:
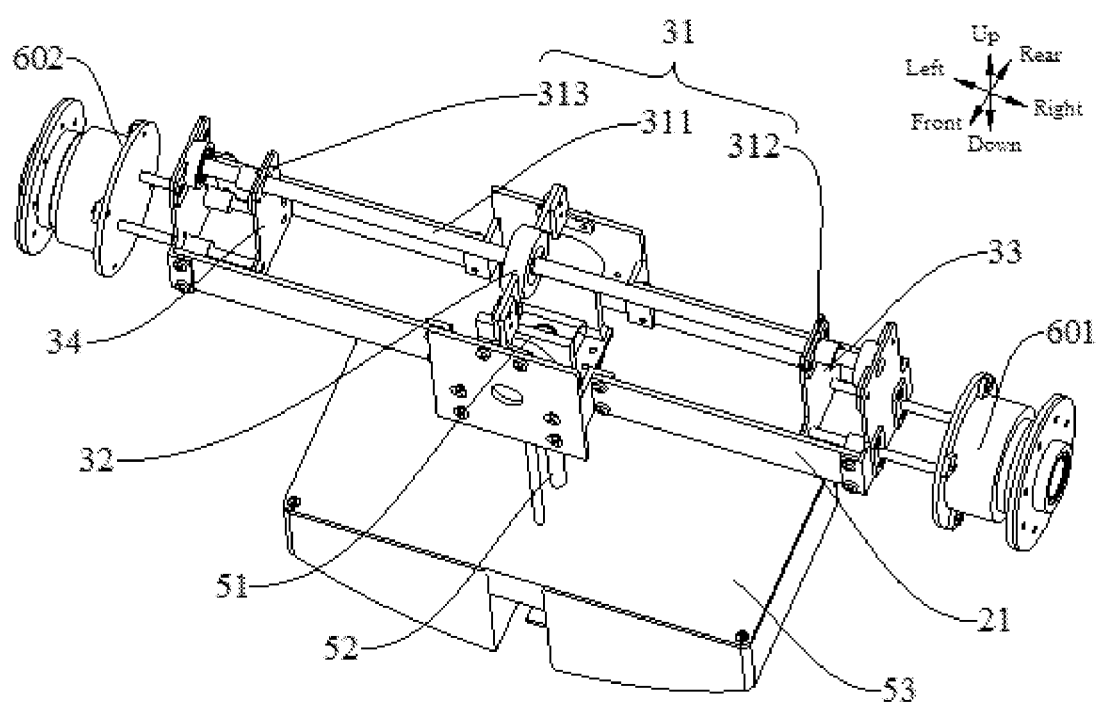
FIG. 9 is a schematic diagram illustrating a telescopic assembly of a robot with an adjustable rotary wing angle according to embodiments of the present disclosure.
Figure 10:
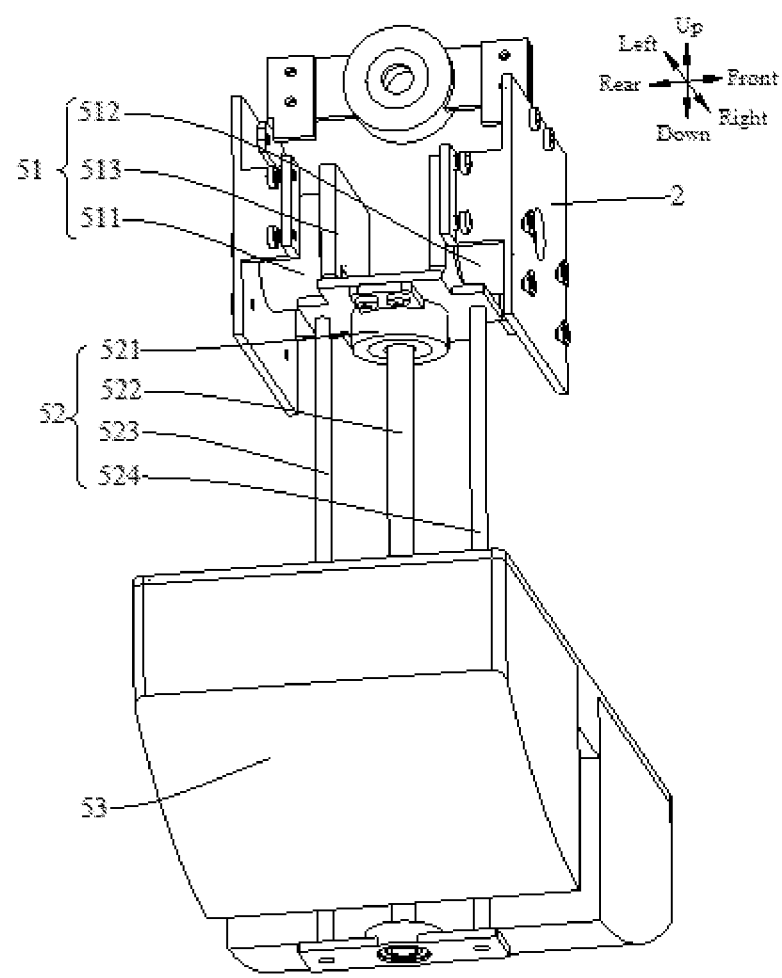
FIG. 10 is a schematic diagram illustrating the pendulum assembly in FIG. 8.
Figure 11:
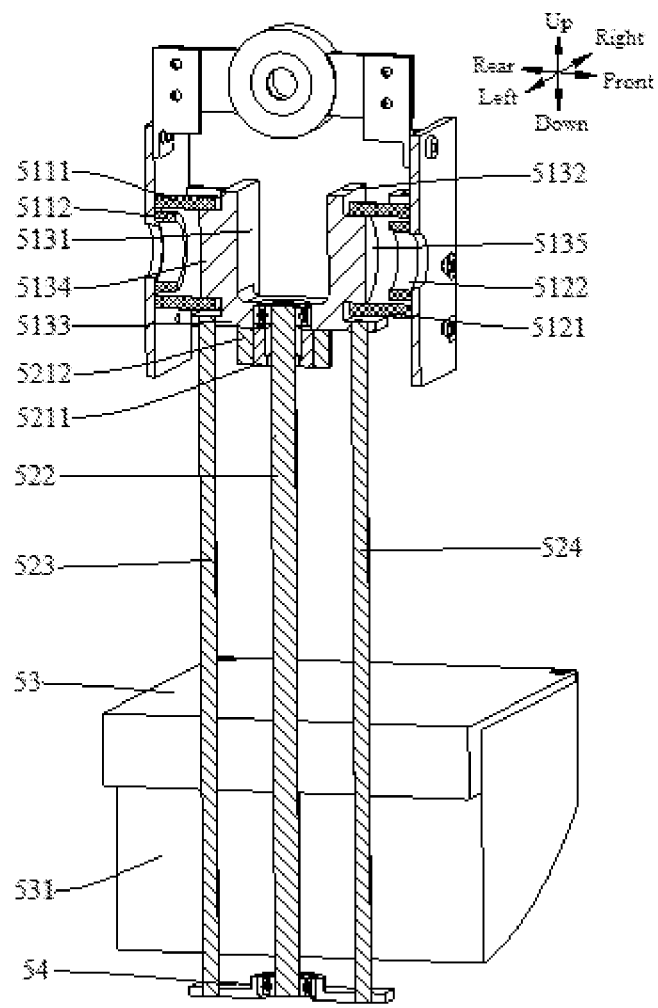
FIG. 11 is a cross-sectional view of a pendulum assembly of a robot with an adjustable rotary wing angle according to embodiments of the present disclosure.

Specifically, as shown in FIG. 9, the outer peripheral side of the telescopic motor 32 is fixedly connected to the rack 2, and a rotating portion of the telescopic motor 32 is connected to the screw assembly 31 to drive the first pushing frame 33 and the second pushing frame 34 to move towards or away from each other in the left-right direction, so that the first shell 11 and the second shell 12 are symmetrical in the left-right direction while changing the spacing between the first drive motor 601 and the second drive motor 602, thereby adjusting the spacing between the first shell 11 and the second shell 12.

The screw assembly 31 includes a two-way screw 311, a first nut portion 312 and a second nut portion 313. The first nut portion 312 and the second nut portion 313 are assembled with the two-way screw 311 in screw-thread fit, a spiral direction of the portion of the two-way screw 311 matched with the first nut portion 312 is opposite to that of the portion of the two-way screw 311 matched with the second nut portion 313, the first nut portion 312 is connected to the first pushing frame 33 to drive the first pushing frame 33, and the second nut portion 313 is connected to the second pushing frame 34 to drive the second pushing frame 34.

Therefore, when the telescopic motor 32 drives the two-way screw 311 to rotate, the first nut portion 312 and the second nut portion 313 move along the axial direction of the two-way screw 311, driving the first pushing frame 33 and the second pushing frame 34 to move in the left-right direction, thereby driving the first drive motor 601 and the second drive motor 602 to move relative to the rack 2 in the left-right direction, so that the first shell 11 and the second shell 12 move relative to the rack 2 in the left-right direction to open and close the housing.

In some embodiments, the robot with the adjustable rotary wing angle according to embodiments of the present disclosure includes a pendulum assembly 5 disposed on the rack 2 and adapted to adjust a center of gravity of the robot to adjust a direction of travel of the robot or to improve a stability. Specifically, as shown in FIG. 1 and FIG. 6 to FIG. 8, the pendulum assembly 5 is located at a lower side of the rack 2, and the pendulum assembly 5 is stabilized at the lower side of the rack 2 under the action of gravity, so that the attitude of the rack 2 is kept stable in the second configuration of the robot with the adjustable rotary wing angle according to embodiments of the present disclosure.

As shown in FIG. 6, when the robot with the adjustable rotary wing angle according to embodiments of the present disclosure rolls in the second configuration, the pendulum assembly 5 may adjust and shift the center of gravity of the robot with the adjustable rotary wing angle according to embodiments of the present disclosure to the left or right side, so that the housing 1 rolls towards the side where the center of gravity is shifted to, thereby driving the robot to turn.

As shown in FIG. 8, when the robot with the adjustable rotary wing angle according to embodiments of the present disclosure is in the flight configuration, the pendulum assembly 5 moves the center of gravity of the robot towards the rotary wing assembly 4, so as to make the center of gravity of the robot close to the rotary wing assembly 4, thereby improving the stability of the robot with the adjustable rotary wing angle according to embodiments of the present disclosure during flight.

In some embodiments, the pendulum assembly 5 includes a first assembly 51, a second assembly 52 and a counterweight 53, the first assembly 51 is disposed on the rack 2, one end of the second assembly 52 is rotatably assembled with the first assembly 51, the counterweight 53 is disposed at the other end of the second assembly 52, the first assembly 51 is adapted to drive the second assembly 52 to swing to adjust an inclination angle of the counterweight 53, and the second assembly 52 is adapted to drive the counterweight 53 to translate to adjust a spacing between the counterweight 53 and the first assembly 51.

Specifically, as shown in FIG. 8, the first assembly 51 is arranged in the front-rear direction, the second assembly 52 is arranged in the radial direction of the first assembly 51, the counterweight 53 is located at one end of the second assembly 52 away from the first assembly 51, and the first assembly 51 is able to rotate relative to the rack 2 to adjust the extending direction of the second assembly 52, thereby adjusting the position of the counterweight 53 in the circumferential direction of the first assembly 51. The second assembly 52 drives the counterweight 53 to move in the extending direction of the second assembly 52 to adjust the spacing between the counterweight 53 and the first assembly 51, thereby adjusting the position of the center of gravity of the robot with the adjustable rotary wing angle according to embodiments of the present disclosure.

Therefore, when the robot with the adjustable rotary wing angle according to embodiments of the present disclosure rolls to advance in the second configuration, the first assembly 51 drives the counterweight 53 to swing left and right to enable the center of gravity of the robot with the adjustable rotary wing angle according to embodiments of the present disclosure to move left and right, so that the robot tilts to the direction where the center of gravity is shifted to adjust the advancing direction in which the robot rolls. When the robot with the adjustable rotary wing angle according to embodiments of the present disclosure flies in the first configuration, the second assembly 52 adjusts the position of the counterweight 53 in the up-down direction to make the center of gravity of the robot close to the moment arm of the lifting force generated by the rotary wing assembly 4, thereby improving the stability of the robot during flight.

In some embodiments, the first assembly 51 includes a first swing motor 511, a second swing motor 512 and a rotating frame 513, the rotating frame 513 is connected between the first swing motor 511 and the second swing motor 512, the first swing motor 511 and the second swing motor 512 are coaxially arranged to drive the rotating frame 513 to rotate, and the second assembly 52 is connected to the rotating frame 513 and extends in the radial direction of the rotating frame 513.

Specifically, as shown in FIG. 8, the front end of the first swing motor 511 is connected to the rack 2, the rear end of the first swing motor 511 is connected to the rotating frame 513, the front end of the second swing motor 512 is connected to the rotating frame 513, and the rear end of the second swing motor 512 is connected to the rack 2. The first swing motor 511 and the second swing motor 512 are arranged symmetrically in the front-rear direction, the first swing motor 511 and the second swing motor 512 rotate synchronously to drive the rotating frame 513 to rotate in a plane perpendicular to the front-rear direction, and the rotary shaft 45 of the rotating frame 513 extends in the front-rear direction, thereby changing the position of the counterweight 53 in the left-right direction.

Therefore, on the one hand, the first swing motor 511 and the second swing motor 512 are symmetrically arranged in the front-rear direction, so that the mass of the first assembly 51 is distributed symmetrically in the front-rear direction, which improves the stability of the center of gravity of the robot with the adjustable rotary wing angle according to embodiments of the present disclosure in the front-rear direction. On the other hand, the coaxial arrangement of the first swing motor 511 and the second swing motor 512 improves the output torque of the first swing motor 511 and the second swing motor 512, thereby facilitating the swing of the second assembly 52 and the counterweight 53.

In some embodiments, the rotating frame 513 includes a first portion 5131, a second portion 5132 and a connecting portion 5133. The first portion 5131 and the second portion 5132 are arranged at intervals in parallel, the first portion 5131 is connected to the first swing motor 511, the second portion 5132 is connected to the second swing motor 512, the connecting portion 5133 is connected between the first portion 5131 and the second portion 5132, and a groove is formed between the first portion 5131, the second portion 5132 and the connecting portion 5133. Specifically, the rotating frame 513 has a "C"-shaped structure. The first portion 5131 and the second portion 5132 are arranged in parallel to each other, and the first portion 5131 and the second portion 5132 are arranged at intervals in the front-rear direction. There is a set interval between the first portion 5131 and the second portion 5132 to define an assembly space. The first portion 5131 is located at the front side of the second portion 5132, the connecting portion 5133 is arranged horizontally and the front end of the connecting portion 5133 is connected to the upper end of the first portion 5131, and the rear end of the connecting portion 5133 is connected to the upper end of the second portion 5132.

In some embodiments, the first portion 5131, the second portion 5132 and the connecting portion 5133 are rectangular plate structures, the front end of the first swing motor 511 is connected to the rear side of the first portion 5131, and the rear end of the second swing motor 512 is connected to the front end of the second portion 5132, and the connecting portion 5133 is located on the upper sides of the first swing motor 511 and the second swing motor 512 to connect the first portion 5131 and the second portion 5132.

Therefore, the first portion 5131 and the second portion 5132 are vertically arranged plate structures, the first swing motor 511 is connected to the rear side of the first portion 5131, and the second swing motor 512 is connected to the front side of the second portion 5132, so as to increase the contact area between the swing motors and the rack 2 at the connection, thereby improving the bearing capacity when the first swing motor 511 and the second swing motor 512 drive the counterweight 53 to swing.

In some embodiments, the first swing motor 511 includes a first rotor portion 5111 and a first stator portion 5112, the second swing motor 512 includes a second rotor portion 5121 and a second stator portion 5122. The first stator portion 5112 is connected to the rack, one end of the first rotor portion 5111 is rotatably fitted to the first stator portion 5112, the other end of the first rotor portion 5111 is connected to the first portion 5131, the second stator portion 5122 is connected to the rack, one end of the second rotor portion 5121 is rotatably fitted to the second stator portion 5122, and the other end of the second rotor portion 5121 is connected to the second portion 5132.

Specifically, the first swing motor 511 and the second swing motor 512 each include a rotor portion and a stator portion. The first stator portion 5112 of the first swing motor 511 is located at the front side of the first swing motor 511, the front end of the first stator portion 5112 of the first swing motor 511 is connected to the rear side of the first portion 5131, the rear end of the first rotor portion 5111 is connected to the front end of the rotating frame 513, the first rotor portion 5111 of the first swing motor 511 is rotatably fitted to the first stator portion 5112 of the first swing motor 511, and the first rotor portion 5111 of the first swing motor 511 and the first stator portion 5112 of the first swing motor 511 are rotatable relative to each other.

The second stator portion 5122 of the second swing motor 512 is located at the rear side of the second rotor portion 5121 of the second swing motor 512, the rear end of the second stator portion 5122 of the second swing motor 512 is connected to the second portion 5132, the front end of the second rotor portion 5121 of the second swing motor 512 is connected to the rear end of the rotating frame 513, the second rotor portion 5121 of the second swing motor 512 is rotatably fitted to the second stator portion 5122 of the second swing motor 512, and the second rotor portion 5121 of the second swing motor 512 is rotatable relative to the second stator portion 5122 of the second swing motor 512.

Therefore, while the second rotor portion 5121 of the second swing motor 512 rotates relative to the second stator portion 5122 of the second swing motor 512, the first rotor portion 5111 of the first swing motor 511 rotates relative to the first stator portion 5112 of the first swing motor 511. When the second rotor portion 5121 of the second swing motor 512 rotates relative to the second stator portion 5122 of the second swing motor 512, the second rotor portion 5121 of the second swing motor 512 drives the rotating frame 513 to rotate along the axial line of the swing motor, and when the first rotor portion 5111 of the first swing motor 511 rotates relative to the first stator portion 5112 of the first swing motor 511, the first rotor portion 5111 of the first swing motor 511 drives the rotating frame 513 to rotate along the axial line of the swing motor, so that the first swing motor 511 and the second swing motor 512 synchronously drive the rotating frame 513 to swing, thereby improving the capacity of the pendulum assembly 5 to adjust the center of gravity of the robot with the adjustable rotary wing angle according to embodiments of the present disclosure.

In some embodiments, the first portion 5131 is provided with a first protrusion 5134, the second portion 5132 is provided with a second protrusion 5135, and the first protrusion 5134 and the second protrusion 5135 are arranged symmetrically in the width direction of the rotating frame 513. A portion of the first protrusion 5134 is rotatably fitted to the first rotor portion 5111, and a portion of the second protrusion 5135 is rotatably fitted to the second rotor portion 5121.

Specifically, the first protrusion 5134 protrudes forwards from the front end of the first portion 5131, and the second protrusion 5135 protrudes rearwards from the rear end of the second portion 5132. The first protrusion 5134 is fitted in the first rotor portion 5111 of the first swing motor 511, and the second protrusion 5135 is fitted in the second rotor portion 5121 of the second swing motor 512.

The first rotor portion 5111 of the first swing motor 511 has a cylindrical structure, the first stator portion 5112 of the first swing motor 511 is rotatably assembled in the inner cylinder of the first rotor portion 5111 of the first swing motor 511, and the first protrusion 5134 is assembled in the first rotor portion 5111 of the first swing motor 511 under an interference fit. The second rotor portion 5121 of the second swing motor 512 has a cylindrical structure, the second stator portion 5122 of the second swing motor 512 is rotatably assembled in the inner cylinder of the second rotor portion 5121 of the second swing motor 512, and the second protrusion 5135 is assembled in the second rotor portion 5121 of the second swing motor 512 under an interference fit.

Therefore, a portion of the first protrusion 5134 is assembled in the first rotor portion 5111 of the first swing motor 511, and a portion of the second protrusion 5135 is assembled in the second rotor portion 5121 of the second swing motor 512, thereby improving the radial bearing capacity of the connections between the rotating frame 513 and the first swing motor 511 and the second swing motor 512, so that the rotating frame 513, the first swing motor 511 and the second swing motor 512 may bear the counterweight 53 with a larger weight.

In some embodiments, the second assembly 52 includes an adjusting motor 521, an adjusting screw 522, a first guide rod 523 and a second guide rod 524. The adjusting motor 521 is fixedly connected to the rotating frame 513 and is connected to the adjusting screw 522 to drive the adjusting screw 522 to rotate, the first guide rod 523 and the second guide rod 524 are arranged in parallel to and spaced apart from the adjusting screw 522, and the adjusting screw 522 is located between the first guide rod 523 and the second guide rod 524. The counterweight 53 is slidably fitted to the first guide rod 523 and the second guide rod 524, and the adjusting screw 522 is connected to the counterweight 53 in screw-thread fit to drive the counterweight 53 to move along the two-way screw 311.

Specifically, as shown in FIG. 8, the adjusting motor 521 is connected to the rotating frame 513, the adjusting screw 522 extends in the radial direction of the rotary shaft 45 of the rotating frame 513, the first guide rod 523 and the second guide rod 524 are arranged in parallel to and spaced apart from the adjusting screw 522, the adjusting motor 521 is connected to the adjusting screw 522 to drive the adjusting screw 522 to rotate in the circumferential direction of the adjusting screw 522.

When the adjusting screw 522 rotates, the counterweight 53 moves in the axial direction of the adjusting screw 522 to adjust the spacing between the counterweight 53 and the first mechanism, so that the mass of the robot with the adjustable rotary wing angle according to embodiments of the present disclosure is distributed closer to the rotary wing assembly 4. In this way, in the flight configuration, when the first assembly 51 adjusts the position of the counterweight 53 in the left-right direction, the counterweight 53 exerts a smaller torsional moment on the robot, thereby improving the stability of the robot in the flight configuration.

In some embodiments, the adjusting motor 521 includes a third rotor portion 5211 and a third stator portion 5212, the third stator portion 5212 is connected to the connecting portion, the third rotor portion 5211 is sleeved on the outer peripheral side of the adjusting screw 522 and is connected to the adjusting screw 522, the third rotor portion 5211 is rotatably fitted to the third stator portion 5212 to drive the adjusting screw 522 to rotate, and the adjusting screw 522 is connected to the counterweight 53 in screw-thread fit to drive the counterweight 53 to move along the two-way screw.

Specifically, the rotary shaft of the adjusting motor 521 extends in the up-down direction, the upper end of the third stator portion 5212 of the adjusting motor 521 is connected to the lower end surface of the connecting portion of the rotating frame 513, the third rotor portion 5211 of the adjusting motor 521 is rotatably assembled in the third stator portion 5212 of the adjusting motor 521, and the adjusting screw 522 is assembled in the third rotor portion 5211 of the adjusting motor 521 and is connected to the third rotor portion 5211 of the adjusting motor 521.

The counterweight 53 is provided with a threaded hole and a guide hole, the threaded hole extends in the up-down direction and penetrates through the counterweight 53, the extending direction of the guide hole is the same as that of the threaded hole, and the guide hole penetrates through the counterweight 53, and the adjusting screw 522 is assembled in the threaded hole in screw-thread fit.

Therefore, when the third rotor portion 5211 of the adjusting motor 521 rotates relative to the third stator portion 5212 of the adjusting motor 521, the adjusting screw 522 is driven to rotate in the circumferential direction of the adjusting motor 521, so that the counterweight 53 translates in the axial direction of the adjusting screw 522 to change the spacing between the counterweight 53 and the rotating frame 513.

The upper end of the adjusting screw 522 protrudes from the third rotor portion 5211 of the adjusting motor 521 to form an extension section, and the extension section is rotatably assembled to the connecting portion of the rotating frame 513 through a first bearing. Therefore, when the adjusting screw 522 bears the torsional moment rotated relative to the rotating frame 513, the first bearing between the extension section and the connecting portion bears the radial moment of the adjusting screw 522, thereby reducing the radial moment applied to the adjusting motor 521.

In some embodiments, the pendulum assembly includes an end plate 54, one end of the adjusting screw 522 is rotatably fitted to the connecting portion, the other end of the adjusting screw 522 is rotatably fitted to the end plate 54, and the first guide rod 523 and the second guide rod 524 are connected between the end plate 54 and the connecting portion.

Specifically, the first guide rod 523 and the second guide rod 524 are arranged symmetrically along the axial line of the adjusting screw 522, the first guide rod 523 and the second guide rod 524 are located on the left and right sides of the adjusting screw 522, respectively, the end plate 54 extends in the left-right direction, the end plate 54 is disposed on the lower end of the adjusting screw 522 and is connected to the lower ends of the first guide rod 523 and the second guide rod 524, the adjusting screw 522 is rotatably assembled to the end plate 54 through a second bearing, and the lower ends of the first guide rod 523 and the second guide rod 524 both are fixedly connected to the end plate 54.

Therefore, the end plate 54 connects the lower ends of the guide rods with the lower end of the adjusting screw 522, which not only improves the structural strength of the assembly composed of the first guide rod 523, the second guide rod 524, the adjusting screw 522 and the counterweight 53, but also improves the guiding accuracy of the first guide rod 523 and the second guide rod 524 to the counterweight 53 when the counterweight 53 translates in the axial direction of the guide rods.

In some embodiments, the counterweight 53 is provided with an avoiding groove 531, and the avoiding groove 531 extends in the length direction of the adjusting screw 522 and is adapted to avoid the end plate 54.

Specifically, the avoiding groove 531 is located at the lower side of the counterweight 53 and extends in the left-right direction, the width of the avoiding groove 531 is greater than that of the end plate 54, the lower end of the threaded hole of the counterweight 53 communicates with the avoiding groove 531, and the lower end of the guide hole of the counterweight 53 communicates with the avoiding groove 531.

Therefore, at least part of the adjusting screw 522 and at least part of the guide rod are located in the avoiding groove 531. When the counterweight 53 moves downwards, the end plate 54 may move into the avoiding groove 531, thereby increasing the travel of the counterweight 53 in the axial direction of the adjusting screw 522.

In some embodiments, the counterweight 53 has an inner cavity, which is adapted to receive a counterweight object. Specifically, the counterweight 53 has a hollow structure. Therefore, the battery and other components with a high density of the robot with the adjustable rotary wing angle according to embodiments of the present disclosure may be arranged in the counterweight 53. In this way, on the one hand, the weight 53 has a large mass, which may adjust the position of the center of gravity of the robot with the adjustable rotary wing angle according to embodiments of the present disclosure, and on the other hand, the volume of the robot with the adjustable rotary wing angle according to embodiments of the present disclosure may be reduced by installing components such as the battery in the inner cavity.

In the specification, it is to be understood that terms such as "central," "longitudinal," "lateral," "length," "width," "thickness," "upper," "lower," "front," "rear," "left," "right," "vertical," "horizontal," "top," "inner," "outer," "clockwise," "counterclockwise," "axial," "radial" and "circumferential" should be construed to refer to the orientation as then described or as shown in the drawings under discussion. These relative terms are for convenience of description, but do not indicate or imply that the device or element referred to must have a particular orientation, or be constructed or operated in a particular orientation, and thus shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, such as two, three and so on, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or may be communicated with each other; may also be direct connections or indirect connections via intervening structures; may also be inner communication or interaction of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "embodiments," "one embodiment", "an example," "another example," "a specific example," or "some examples," means that a particular feature, structure, material, or characteristic described in connection with the embodiment or example is included in at least one embodiment or example of the present disclosure. Thus, the appearances of the phrases such as "in embodiments," "in some embodiments," "in one embodiment", "in an embodiment", "in an example," "in another example," "in a specific example," or "in some examples," in various places throughout this specification are not necessarily referring to the same embodiment or example of the present disclosure. Furthermore, the particular features, structures, materials, or characteristics as described may be combined in any suitable manner in one or more embodiments or examples. In addition, in the absence of contradiction, those skilled in the art can combine different embodiments or examples described in this specification, or combine the features of different embodiments or examples.

Although embodiments and examples have been shown and described herein, it would be appreciated by those skilled in the art that the above embodiments and examples are illustrative, and cannot be construed to limit the present disclosure, and changes, alternatives, modifications and variants may be made in embodiments without departing from spirit, principles and scope of the present disclosure.

What is claimed is:

1. A robot with an adjustable rotary wing angle, comprising:
a housing comprising a first shell and a second shell and having a first configuration and a second configuration, wherein the first shell and the second shell are separated for robot flight in the first configuration, and the first shell and the second shell are closed for robot rolling in the second configuration;

a rack disposed in an inner cavity of the housing;

a telescopic assembly disposed on the rack and connected between the first shell and the second shell, wherein the telescopic assembly is telescopic to switch the housing to the first configuration or the second configuration;

a rotary wing assembly disposed on the rack and having a folded configuration and a flight configuration, the rotary wing assembly including a folding arm, a tilting arm and a rotary wing, wherein;

a first end of the folding arm is rotatably connected to the rack, the tilting arm is connected between the rotary wing and the folding arm, the folding arm, the tilting arm and the rotary wing are accommodated in the housing to roll the housing in the folded configuration, the tilting arm and the rotary wing are extended to an outside of the housing to be adapted to drive the robot to fly in the flight configuration, and the tilting arm is rotatable relative to the folding arm to adjust a rotation direction of the rotary wing; and a pendulum assembly disposed on the rack and adapted to adjust a center of gravity of the robot to adjust a direction of travel of the robot or to improve a stability, wherein;

the pendulum assembly includes a first assembly, a second assembly and a counterweight, the first assembly is disposed on the rack, a first end of the second assembly is rotatably assembled with the first assembly, the counterweight is disposed at a second end of the second assembly, the first assembly is adapted to drive the second assembly to swing to adjust an inclination angle of the counterweight, and the second assembly is adapted to drive the counterweight to translate to adjust a spacing between the counterweight and the first assembly.

2. The robot with the adjustable rotary wing angle of claim 1, wherein;

the rotary wing assembly includes a tilting motor, a first end of the tilting motor is connected to a second end of the folding arm away from the rack, and a second end of the tilting motor is connected to the tilting arm to drive the tilting arm to rotate relative to the folding arm.

3. The robot with the adjustable rotary wing angle of claim 2, wherein:

a first seat is provided at the second end of the folding arm close to the tilting arm, a second seat is provided at a first end of the tilting arm close to the folding arm, the tilting motor includes a first portion and a second portion, the second portion is rotatably fitted to the first portion, the first portion is connected to the first seat, the second portion is connected to the second seat and has a through hole, a rotary shaft is provided in the through hole and penetrates through the first seat and the second seat to improve a radial carrying capacity between the folding arm and the tilting arm.

4. The robot with the adjustable rotary wing angle of claim 3, wherein the rotary wing assembly includes a driver having a first end rotatably connected to a base and a second end rotatably connected to the folding arm, and a length of the driver is adjustable to drive the rotary wing assembly to switch between the flight configuration and the folded configuration.

5. The robot with the adjustable rotary wing angle of claim 4, wherein:

the rotary wing is located at a second end of the tilting arm away from the folding arm and includes a plurality of spiral arms and a flight motor, the flight motor is connected to the plurality of spiral arms and is configured and adapted to drive the plurality of spiral arms to rotate to generate a lift, the plurality of spiral arms are uniformly arranged at intervals in a circumferential direction of the flight motor in the flight configuration to retain the rotary wing assembly in dynamic balance during the rotation, and the plurality of spiral arms are extended in a length direction of the folding arm in the folded configuration to accommodate the rotary wing assembly in the housing.

6. The robot with the adjustable rotary wing angle of claim 5, wherein the rotary wing assembly comprises a first rotary wing assembly and a second rotary wing assembly, and the first rotary wing assembly and the second rotary wing assembly are symmetrically arranged in a width direction of the rack.

7. The robot with the adjustable rotary wing angle of claim 2, comprising:

a first drive motor disposed at a first end of the telescopic assembly and connected to the first shell, wherein the first drive motor is adapted to drive the first shell to rotate; and a second drive motor disposed at a second end of the telescopic assembly and connected to the second shell, wherein the second drive motor is adapted to drive the second shell to rotate.

8. The robot with the adjustable rotary wing angle of claim 7, wherein the telescopic assembly comprises:

a screw assembly;

a telescopic motor;

a first pushing frame connected to the first drive motor and assembled with the rack in a guided manner in a length direction of the rack; and a second pushing frame connected to the second drive motor and assembled with the rack in the guided manner in the length direction of the rack, wherein the telescopic motor is connected to the screw assembly to drive the screw assembly to rotate, and the screw assembly extends in the length direction of the rack and is connected to the first pushing frame and the second pushing frame to drive the first pushing frame and the second pushing frame to move relative to the rack.

* * * * *